Figure 1:
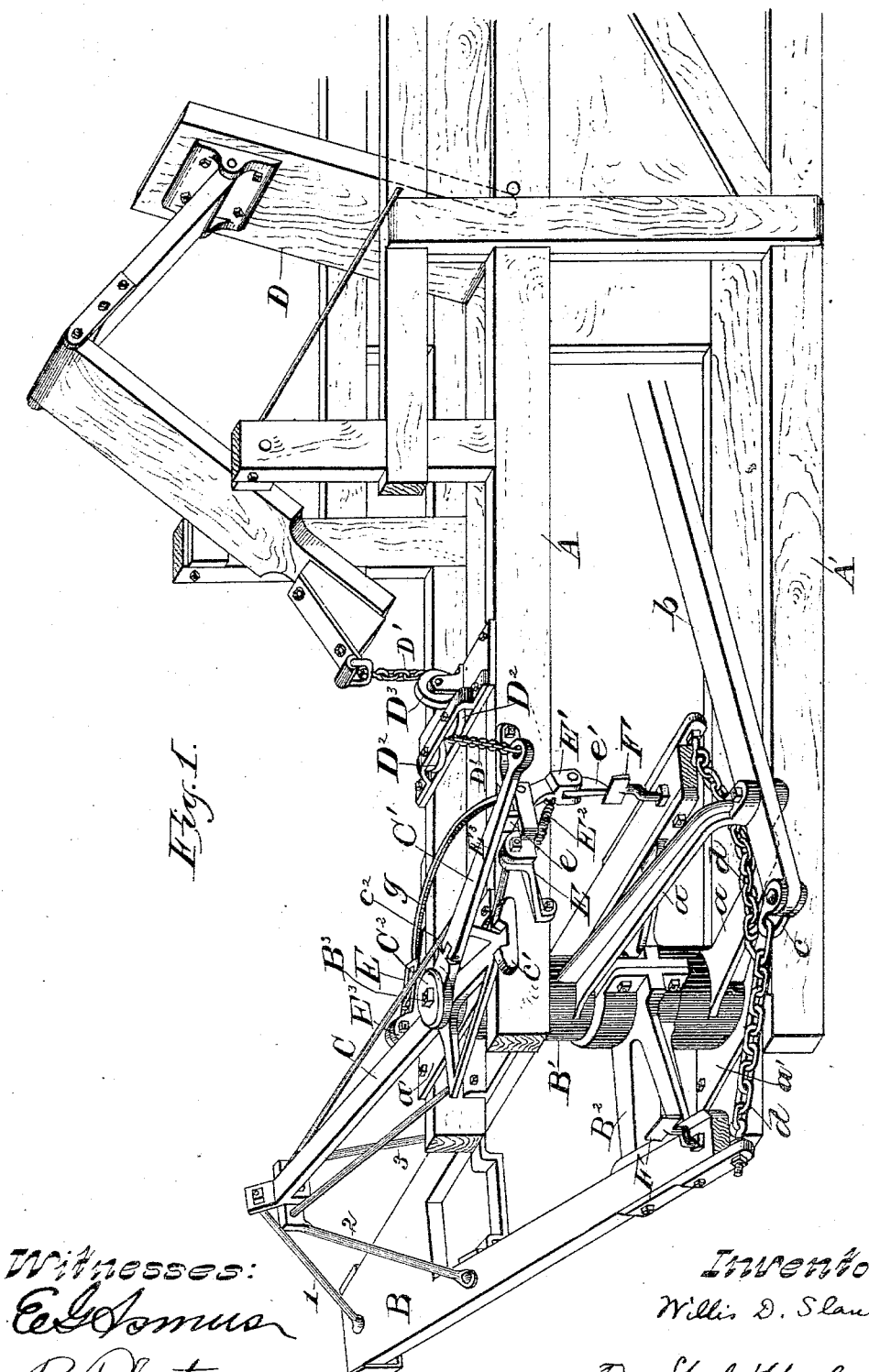

(No Model.) 2 Sheets—Sheet 1.
W. D. SLAUSON.
BALING PRESS.
No. 315,965. Patented Apr. 14, 1885.

Witnesses:
E. G. Somus
R. Platz

Inventor
Willis D. Slauson
By Stout & Underwood
Attorneys.

(No Model.) 2 Sheets—Sheet 2.
W. D. SLAUSON.
BALING PRESS.
No. 315,965. Patented Apr. 14, 1885.
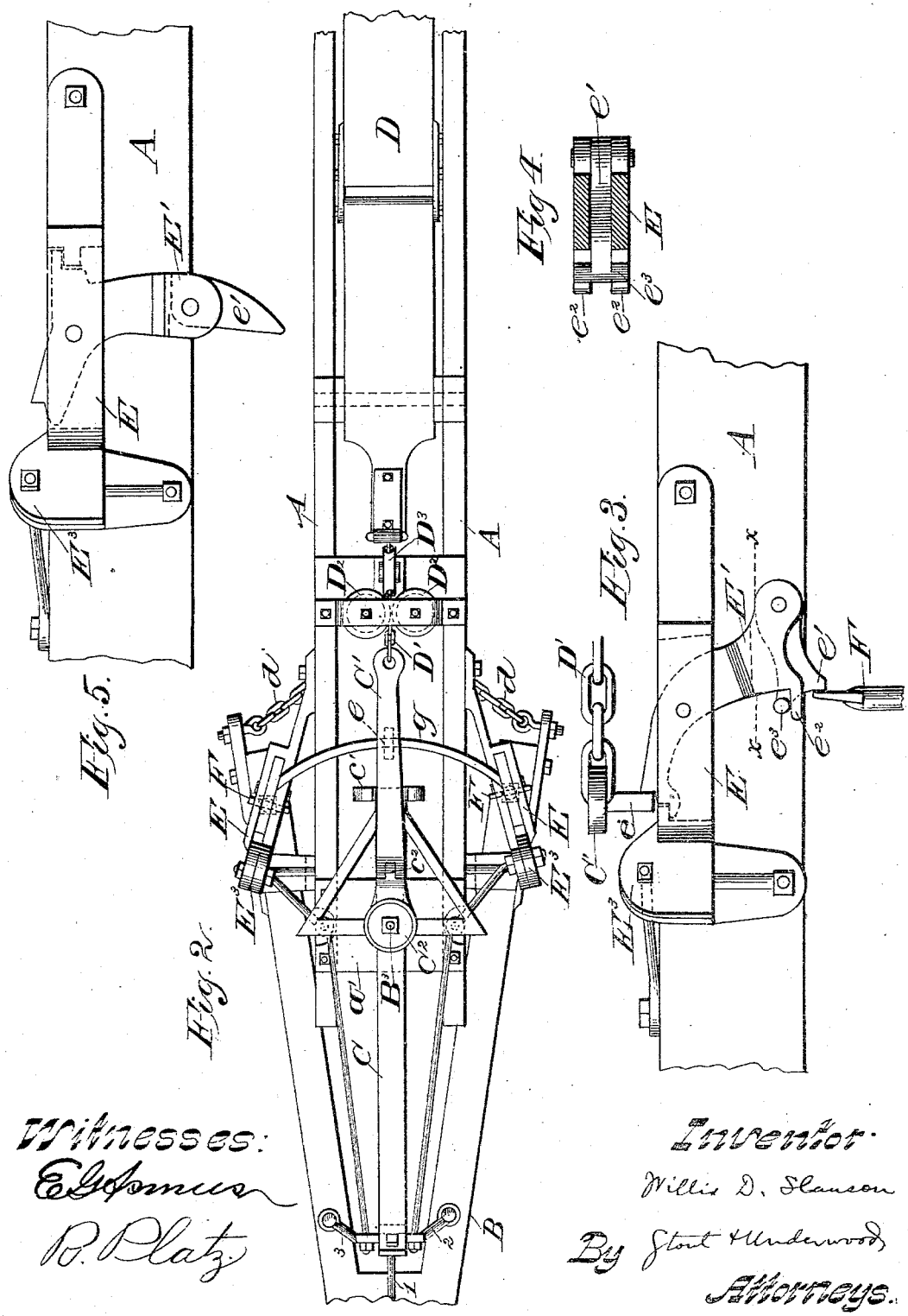

UNITED STATES PATENT OFFICE.

WILLIS D. SLAUSON, OF RACINE, WISCONSIN.

BALING-PRESS.

SPECIFICATION forming part of Letters Patent No. 315,965, dated April 14, 1885.

Application filed December 10, 1884. (No model.)

*To all whom it may concern:*

Be it known that I, WILLIS D. SLAUSON, of Racine, in the county of Racine and State of Wisconsin, have invented certain new and useful Improvements in Baling-Presses; and I do hereby declare that the following is a full, clear, and exact description thereof.

My invention relates to baling-presses, and will be fully described hereinafter.

In the drawings, Figure 1 is a side elevation of a portion of a press embodying my improvements. Fig. 2 is a top view of the same, and Figs. 3, 4, and 5 are details.

My present device is designed as an improvement on that for which Letters Patent No. 287,734 were granted me on the 30th day of October, 1883, where the material is compressed by a plunger actuated by horse-power.

Referring to the drawings, A A' are respectively the upper and lower sills of the press.

B is a sweep that is pivoted on a swing-post, B', between the upper and lower members of the press by a bracket, $B^2$, and the post B' swings on a king-bolt, $B^3$, that is fixed in brackets $a'$ $a'$ to the frame A A' above and below the bracket $B^2$. The post B' is provided with two arms, $a$ $a$, and between the outer ends of these two arms $a$ $a$ the bar $b$, that operates the compressing-plunger, is pivoted. I have not shown the compressing-plunger, as it does not differ materially from that shown in my patent above referred to. The outer end of the bar $b$ is provided with a clevis, $c$, and a chain, $d$, connects the rear ends of the sweep members with the clevis and bar $b$.

Just above the upper members, A, of the frame a trussed lever, C, is pivoted to post B', and the outer end of this lever is securely connected with the sweep B by braces 1 2 3. The inner or short arm of lever C is formed into a double-lipped catch, $c'$, and above this lever C another lever, C', is pivoted to post B', and held in place by a cap, $C^2$, and superimposed nut.

The outer end of lever C' is connected with the lever of the hinged beater D by a chain, D', guided by suitable sheaves, $D^2$ $D^2$ $D^3$, and is preferably jointed near its pivoted end, as at $c^2$, to give it slight vertical play; but instead of its being jointed the play may be permitted by loosening the cap $C^2$. Near its outer end lever C' is provided with a lug, $e$, that depends from its under side.

E are brackets that are secured one to each of the upper members, A, and in a vertical slot in each bracket E a dog, E', is pivoted. These dogs are held normally by spring $E^2$, or by being overbalanced, in such a position that their upper ends or arms will project up and out of the slots in the brackets E in such a manner that while the lug $e$ of lever C' will ride over either one in going in one direction, it will be prevented from returning by it, as shown in Fig. 3, and each dog E' has a pivoted pawl-shaped finger, $e'$, depending from its lower end for contact with a lug, F, on the sweep, so that at the proper time in the travel of the sweep the dog may be caused to release the lever C'.

Figs. 1 and 5 show a form of trip in which the spring $E^2$ is used; but in Fig. 3 I have formed the dog E' with a lug, $e^2$, that projects from it horizontally, and have provided the finger $e'$ with a lug, $e^3$, that rests on lug $e^2$. The under side of finger $e'$, Fig. 3, is curved so as to permit the lug F to ride under it without affecting the dog in going in one direction, while its free end is abrupt, that it may receive the lug F and transmit its tripping action to the dog E'. A curved track, $g$, extends from one bracket E to the other, and forms a rest for the lug on lever C as it travels back and forth.

The operation of my device is as follows: The machine is to be operated by animals attached to the outer end of the sweep. When the parts are in the position shown in Fig. 1, the machine is ready to receive the material to be baled in the compressing-chamber, the entrance to which is beneath the beater D. The beater D is raised and held up by lever C', which is caught by the dog E', as shown in Fig. 3, and the lug F is just in front of finger $e'$, ready to trip the dog E' from engagement with the stop or lug $e$ on lever C'. Now, just as soon as the animals start the sweep in the direction of the arrow the stop F will trip the dog E' and release lever C' and cause it to allow beater D to drop, and then as the sweep continues to travel its chain $d$ will straighten the bar $b$ and cause it to advance the plunger, and at the same time draw the arms $a$ $a$ about until they and the plunger are parallel with the members A A' and the full limit of pressure is attained, and this will bring the catch $c'$ directly under and in engagement with the lever C', and, therefore, as the sweep continues to advance the lever C' will be carried to the other side of the machine, and will draw upon chain D' to again lift the beater D, and then when the lever C' has reached and passed the point of dog E' on the side of the machine opposite to that shown in Fig. 1 the raised and rounded portion $E^3$ of bracket E will lift it out of catch $c'$, and it will be held by the dog E' until the sweep begins to return, and it is released by the contact of stop F with finger $e'$, the parts being in exactly the same position on the opposite side of the machine as they are shown to be in on the side that is illustrated by Fig. 1.

Having thus described my invention, what I claim as new, and desire to secure by Letters Patent, is—

1. In a baling-press, the combination of a king-bolt and swing-post, a sweep, and a lever, C, connected therewith, both pivoted on the king-bolt, the sweep being connected with the baling-plunger, and the lever having a double-lipped catch on its free end, with a lever, C', beater and connecting-chain, a dog, E' $e'$, and bracket E $E^3$, and lugs projecting up from the rear end of the sweep, substantially as described.

2. The lever C, having double-lipped catch in its free end, in combination with lever C', and the beater-brackets E $E^3$, dogs E' $e'$, the sweep, and its lugs, as set forth.

In testimony that I claim the foregoing I have hereunto set my hand, at Racine, in the county of Racine and State of Wisconsin, in the presence of two witnesses.

WILLIS D. SLAUSON.

Witnesses:
S. S. STOUT,
H. G. UNDERWOOD.